US006393347B1

(12) United States Patent
Snyder et al.

(10) Patent No.: US 6,393,347 B1
(45) Date of Patent: May 21, 2002

(54) DATA RECORDING METHOD FOR A MARINE PROPULSION DEVICE

(75) Inventors: Richard H. Snyder; Robert E. Haddad, both of Oshkosh, WI (US); Steven M. Basso, Bedford (AU)

(73) Assignee: Brunswick Corporation, Lake Fores, IL (US)

( * ) Notice: Subject to any disclaimer, the term of this patent is extended or adjusted under 35 U.S.C. 154(b) by 0 days.

(21) Appl. No.: 09/885,153

(22) Filed: Jun. 20, 2001

(51) Int. Cl.[7] .................................................. G06F 7/00

(52) U.S. Cl. .......................... 701/35; 701/100; 440/113

(58) Field of Search .......................... 701/35, 100, 101, 701/102, 110; 360/5; 702/187; 440/113

(56) References Cited

U.S. PATENT DOCUMENTS 3,946,364 A 3/1976 Codomo et al. ............ 340/172
4,575,803 A 3/1986 Moore ........................ 364/551
4,729,102 A 3/1988 Miller et al. ................ 364/424
5,033,010 A 7/1991 Lawrence et al. .......... 364/550
5,581,464 A 12/1996 Woll et al. .................. 364/424

*Primary Examiner*—Yonel Beaulieu
(74) *Attorney, Agent, or Firm*—William D. Lanyi

(57) ABSTRACT

A data storing method for a marine propulsion system uses two groups of three data logs each in which each data log comprises a plurality of data records. The information on preselected parameters are stored into the data records of the three data logs at different time increments. This allows the three data logs to cover a relatively long period of time at a lesser resolution, a shortest period of time at a highest resolution, and an intermediate period of time at an intermediate resolution. This allows an analyst to carefully review the various parameter magnitudes during the periods of time immediately preceding a catastrophic event, such as an accident or an engine failure, either of which resulting in an engine shut down.

20 Claims, 6 Drawing Sheets

DATA RECORDING METHOD FOR A MARINE PROPULSION DEVICE

BACKGROUND OF THE INVENTION

1. Field of the Invention

The present invention is generally related to a data recording method for a marine propulsion device and, more specifically, to a method for recording data using alternating groups of data logs in which each of the data logs in a group contains data stored at different incremental times.

2. Description of the Prior Art

Many different systems are known to those skilled in the art for storing data relating to a vehicle, such as an automobile or airplane. U.S. Pat. No. 4,729,102 which issued to Miller et al on Mar. 1, 1988, describes an aircraft data acquisition and recording system. The system combines flight data recorder data acquisition circuitry and airborne integrated data circuitry that can be variously packaged to supplement and update existing aircraft systems or serve as a standalone flight data recording and/or airborne integrated data system. The flight data recorder system circuitry and airborne integrated data system circuitry are separately programmed microprocessor based systems that are capable of processing aircraft parametric signals provided by a variety of aircraft signal sources. The airborne integrated data system circuitry is arranged and programmed to automatically monitor engine start and shutdown procedures, airplane takeoff and cruise and to provide a landing report that indicates fuel consumption and landing weight. To minimize memory storage requirements and provide readily available engine condition information, the automatic monitoring consists of a single set of signals for each monitored condition and the information is converted to standard engineering units. Monitoring of selected parametric signals to detect excessive levels also is provided. Stored data is periodically retrieved by means of a ground readout unit.

U.S. Pat. No. 5,033,010, which issued to Lawrence et al on Jul. 16, 1991, discloses a turbine engine monitoring system which disposes a data storage device in permanent association with an engine being monitored. The data storage device comprises an electrically erasable programmable read-only memory which is contained in an enclosure and permanently attached to the engine. A connection link is provided to connect the memory device in signal communication with an external device, such as an engine control unit. The engine control unit is connected in signal communication with a plurality of transducers that enable the engine control unit to monitor the operational status of a plurality of parameters relating to the turbine engine. By permanently attaching the data storage device to the turbine engine, a lifetime information of the turbine engine can be maintained in permanent association with the turbine engine regardless of replacement of the turbine engine or its related engine control unit.

U.S. Pat. No. 4,575,803, which issued to Moore on Mar. 11, 1986, describes an engine monitor and recorder. The system includes an engine mounted unit which contains at least a non-volatile memory and a data processor and a remote unit suitable for either cockpit mounting or for accessing by a ground portable unit including an additional data processor and a display unit. Thermocouples and other sensors mounted on the engine supply raw data to the engine mounted electronics unit, and this input information includes temperature data. Elevated over-temperature levels are segregated and the time during which the engine is within each of the over-temperature bands is measured, and is recorded in an non-volatile, electronically alterable memory which is periodically updated during operation of the aircraft. The number of starts is also counted and stored, and the total running time of the engine is also recorded. Upon command from the remote unit, information is transferred from the non-volatile memory to the remote display unit, so that the time at which the turbine has been operated at specific over-temperature levels may be readily accessed.

U.S. Pat. No. 3,946,364, which issued to Codomo et al on Mar. 23, 1976, describes a method and apparatus for sensing, storing, and graphically displaying over-temperature conditions of jet engines. The required frequency of inspection, servicing and overhauling of jet engines is to a large extend determined by the history of excessive or over-temperature conditions of each engine. In order to monitor and record each such over-temperature condition, an indicator device is provided having electronic circuitry for processing a temperature signal from the jet engine and a light emitting diode matrix for graphically displaying each over-temperature incident. When the jet engine temperature exceeds a threshold over-temperature point, this occurrence is sensed and the circuitry of the indicator functions to automatically store and visually display the engine temperature as a function of time for the succeeding several seconds after the over-temperature condition has commenced. All the diodes of the matrix lying under the temperature versus time profile are energized so as to present a histogram display of the severity of the condition, where the severity is a function of the duration and magnitude of the over-temperature. In one embodiment disclosed in the patent, a plurality of over-temperature events are automatically sensed, graphically displayed and stored for later retrieval, such that the maintenance crew may subsequently interrogate the indicator device causing it to sequentially display each recorded or electronically stored over-temperature event.

U.S. Pat. No. 5,581,464, which issued to Woll et al on Dec. 3, 1996, describes the recording of operational events in an automotive vehicle. The device provides an event recording apparatus (ERA) that records selectable vehicle performance, operational status, and/or environment information, including information useful for accident analysis and updated software for use by a system processor capable of reading data from the ERA. The preferred embodiment of the ERA comprises a non-volatile solid-state memory card, a memory card adapter located in a vehicle, and a micro-processor, either as part of the memory card or embedded in a system within the vehicle, for controlling the storage of data within the memory card. The ERA is configured to store such information as the closing rate between the recording vehicle and targets located by the vehicle's radar system, distance between the recording vehicle and targets, vehicle speed, and such vehicle operational status and environmental information as braking pressure, vehicle acceleration or deceleration, rate of turning, steering angle, hazard levels determined from a radar system processor, target direction, cruise control status, vehicle engine RPM, brake temperature, brake line hydraulic pressure, windshield wiper status, fog light status, defroster status, and geographic positioning information. In addition, the ERA can be configured to function as a common trip monitor, recording distance traveled, average speed, miles-per-gallon, fuel remaining, compass direction of travel, etc. The device can also record vehicle maintenance information, such as oil temperature, engine temperature, transmission fluid temperature, and engine timing.

Although the prior art teaches many different types of data recording mechanisms and methods for use in conjunction with a vehicle, such as an automobile or airplane, known methods of data storage do not directly address two problems associated with the recording of operational data for a vehicle. First, known recording systems either begin the process of recording data upon the occurrence of an event, such as a vehicle accident evidenced by an activation of an airbag system, or the occurrence of a deleterious operational parameter, such as an over-temperature condition within a cooling system of an engine. Secondly, known systems of this type often utilize mass data storage devices with a high storage capacity in order to store many thousands of data points. Thirdly, data storage systems known to those skilled in the art often do not provide a capability for protecting previously stored data permanently even though the vehicle is restarted and operated subsequent to the event intended to be monitored.

It would therefore be significantly beneficial if a data recording system could be provided in which data is continuously monitored at two or more data acquisition rates in order to provide relatively long term analysis in combination with a much more detailed analysis of the time period immediately preceding a catastrophic event, such as an accident or machine failure. In order to minimize the required memory to accomplish these purposes, it would be significantly beneficial if a system could monitor both short term and longer term usage of a vehicle and, in addition, allow the vehicle to be operated after a catastrophic event without destroying the stored data prior to the event.

SUMMARY OF THE INVENTION

A data recording method, in accordance with the preferred embodiment of the present invention, comprises the steps of providing first and second groups of data logs. The data logs can be three in number in each group and each data log can comprise twenty data records. Information is stored at different rates in each of the data logs. The present invention further comprises the step of monitoring an operating status of the marine propulsion device, such as an outboard motor, inboard engine, or stern drive unit. Throughout the description of the present invention, "outboard motor" shall be used to mean any marine propulsion device which comprises an engine and is attachable to a transom of a marine vessel. The operating status can be represented by the on/off status as represented by an ignition switch or ignition key. The recording method of the present invention further comprises a step of measuring a magnitude of a first parameter. The first parameter can be selected from a group consisting of engine speed (RPM), engine running time, boat speed, steering angle, trim position, throttle position, or gear selection. In addition, embodiments of the present invention can measure the magnitude of a plurality of parameters, in which each of the plurality of parameters is treated in a manner similar to the method described below. The method of the present invention further comprises the step of measuring elapsed time. This can be accomplished by a standard internal clock of a micro processor that measures time as a series of incremental events at a known rate, such as one event every one hundred milliseconds (0.1 second).

The present invention further comprises the step of selecting one of the first and second groups of data logs. This selection is made as a function of a change in the operating status of the marine propulsion device and as a further function of the identity of a previously selected one of the first and second groups. The change in the operating status of the marine propulsion device is typically a change from an "off" condition of the ignition to an "on" condition of the ignition switch. When this occurs, the present invention determines the current group of data logs that has been most recently used to store data and then switches from that group of data logs to the alternative group of data logs, selected from the first and second groups of data logs. An additional step of the present invention is storing the magnitude of the first parameter as a record in the selected one of the first and second groups of data logs in response to the elapsed time being generally equal to an integral multiple of a preselected time increment. For example, the present invention may be configured to store a new data record in one of the logs when the elapsed time is generally equal to an integral multiple of 0.5 second, 1.0 second, or 5.0 seconds. Other preselected time increments can alternatively be used to determine when data should be stored in the other logs.

In a particularly preferred embodiment of the present invention, each of the first and second groups of data logs comprises three data logs. Each data log comprises 20 records and 7 individual magnitudes of selected parameters are stored in each record. In the particularly preferred embodiment of the present invention, the preselected time increments are 0.5 second, 1.0 second, and 5.0 seconds for the three data logs within each of the first and second groups.

In order to avoid the inadvertent destruction of valuable stored data that is saved prior to an event that needs to be evaluated, a preferred embodiment of the present invention measures the elapsed running time since a most recent change of the operating status (e.g. initiation of ignition) of the marine propulsion system. If the elapsed running time equals or exceeds a predefined magnitude, the data storing step is enabled. Until the elapsed time equals or exceeds a predefined magnitude, the storing step is disabled. In addition, for the purpose of preventing the inadvertent destruction of data following an event that requires analysis, the present invention can also measure an operating characteristic of the marine propulsion device, such as its engine running speed, and then disable the storing step until the operating characteristic equals or exceeds a predefined magnitude. In the case of engine speed, this predefined magnitude can be 400 RPM. In the case when the elapsed running time since the most recent change in the operating status is used to enable or disable the storing step, the predefined magnitude can be 1.0 second.

When the operating status of the marine propulsion device changes, such as when the ignition switch changes from an "off" condition to an "on" condition, the present invention can erase the selected one of the first and second groups of data logs in order to prepare that selected one of the first and second groups for subsequent data storage.

In a data recording method of the present invention, data is continually monitored and stored as long as the engine of the marine propulsion system is operating, with the exception of the initial one second of operation and when the engine is operating at a speed less than 400 RPM. At all other times, data is being stored in the selected one of the first and second groups of data logs. When an event, such as an accident or mechanical failure relating to the marine propulsion device, occurs, causing the engine to cease running, further data storage is inhibited upon a subsequent initiation of ignition. The selected one of the first and second groups then contains sixty records, with twenty records in each log.

BRIEF DESCRIPTION OF THE DRAWINGS

The present invention will be more fully and completely understood from a reading of the description of the preferred embodiment, in conjunction with the drawings, in which.

DESCRIPTION OF THE PREFERRED EMBODIMENT

Figure 1:
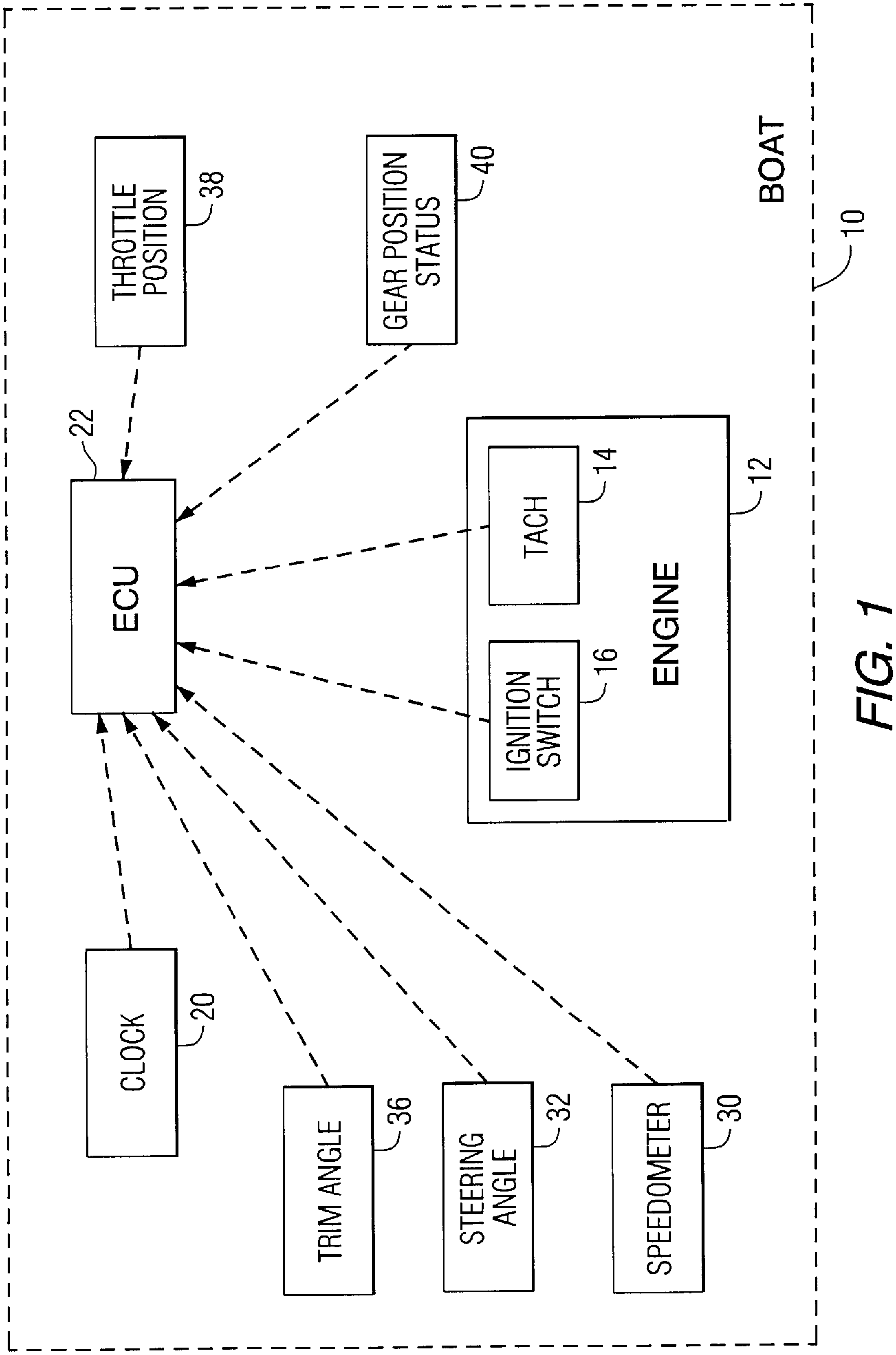
FIG. 1 is a schematic representation of a marine propulsion system made in accordance with the present invention.

Throughout the description of the preferred embodiment of the present invention, like components will be identified by like reference numerals.

FIG. 1 is a schematic representation of a data recorder system for a marine propulsion device used in conjunction with a boat 10. The marine propulsion device comprises an engine 12 that is provided with a tachometer 14 which measures the operating speed of the engine 12. An ignition switch 16 is also associated with the engine 12 to allow the operator of the marine vessel to start and stop the engine.

A clock 20 is provided in order to provide a series of sequential pulses to an engine control unit 22 for the purpose of allowing the engine control unit 22 to measure elapsed time and incremental time between sequential events.

With continued reference to FIG. 1, numerous transducers can be used in conjunction with the boat 10 and connected in signal communication with the engine control unit (ECU) 22. For example, a speedometer 30 can provide a boat speed signal to the engine control unit 22. The speedometer 30 can utilize a rotating paddle wheel, a pitot tube, or a global positioning system (GPS). The steering angle transducer 32 can incorporate a Hall-effect transducer, a potentiometer, or any other transducer that allows the engine control unit 22 to determine the angle of the boat's steering mechanism. Similarly, a trim angle transducer 36 can measure the angle of the marine propulsion drive relative to the transom of the boat 10. A throttle position sensor 38 is used to provide a signal to the engine control unit 22 representing the thrust demand provided by the operator of the marine vessel 10. Also shown in FIG. 1, is a gear position status transducer 40 which provides a signal to the engine control unit 22 representing the gear position status of the marine propulsion system. Typically, this status represents the fact that the propulsion system is in either a motive gear (forward or reverse) or in neutral. The signals represented by the dashed line arrows in FIG. 1 are provided by the various transducers and sensors to the engine control unit 22. The engine control unit 22 receives this data and stores the data in a manner that will be described below in greater detail.

Figure 2:
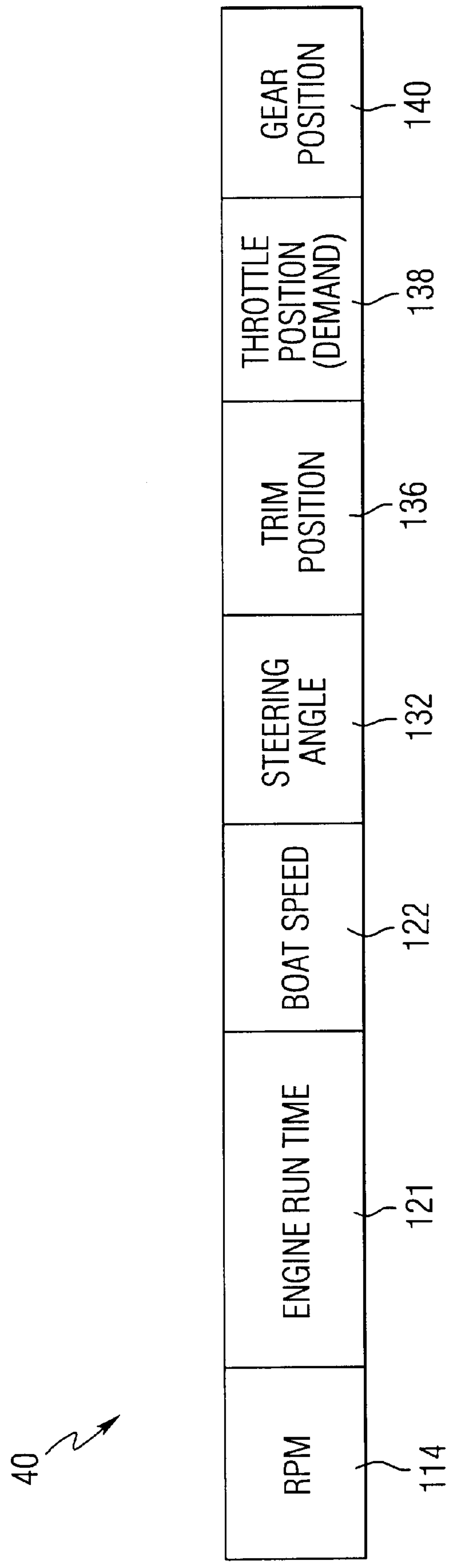
FIG. 2 is a representation of a single data record in which seven parameter magnitudes are stored.

FIG. 2 is a schematic representation of a single data record stored during the performance of the method of the present invention. In the illustrated example, the engine speed (RPM) 114 is stored in a single byte of the record, the engine running time 121 is stored in two bytes, the boat speed 122 is stored in one byte, the steering angle 132 is stored in one byte, the trim position 136 is stored in one byte, the throttle position or demand 138 is stored in one byte, and the gear position 140 is stored as a single bit in a byte. The record 40 shown in FIG. 2 contains magnitudes for seven individual parameters and requires eight bytes of storage. It should be understood that alternative arrangements of data storage for a record are also possible within the scope of the present invention.

Figure 3:
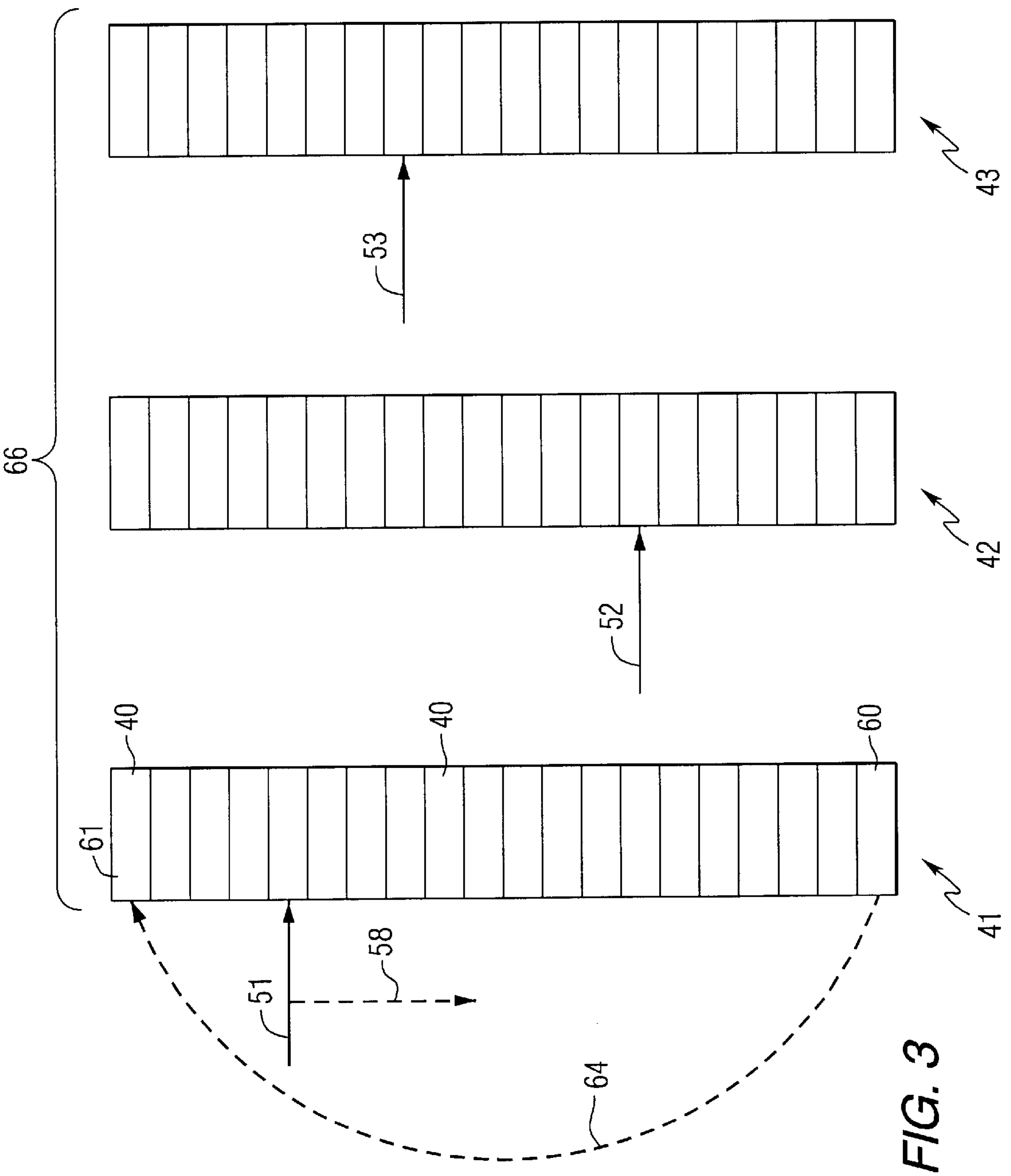
FIG. 3 shows one group of three data logs which each comprise twenty data records.

FIG. 3 is a schematic representation of one group 66 of data logs, 41–43, in which each data log comprises twenty data records 40. Although not specifically shown in FIG. 3, it should be understood that each of the sixty records 40 represented in FIG. 3 contains the seven magnitudes of the parameters described above in conjunction with FIG. 2. Each time a data record is stored in one of the data logs, 41–43, an index or pointer is set to identify the next record of the data log into which data will be stored during the next storing event. These indices are represented by the arrows, 51–53, in FIG. 3. Every time a data record is stored in one of the data logs, the index or pointer is incremented as represented by dashed line arrow 58. When the last data record 60 is filled, the pointer is moved to the first data record 61. This is represented by dashed line arrow 64.

With continued reference to FIG. 3, the three data logs, 41–43, are associated together as a group 66. In a preferred embodiment of the present invention, two such groups are used to store data. Each of the two groups comprises three data logs such as those described above.

In a particularly preferred embodiment of the present invention, the most current magnitude of a selected parameter or plurality of parameters is stored as a record in the first data log 41 every 0.5 second. Data is read by the engine control unit every 0.1 second and, upon each reading of the data, a determination is made as to whether or not it is an appropriate time to store the data record, as a new record, in one or more of the data logs, 41–43. The second data log 42 receives data, as a newly stored record, every 1.0 second and the third data log 43 receives data, as a newly stored record, every 5.0 seconds. The pointers, 51–53, allow the microprocessor to keep track of the location of the next individual record of each of the data logs into which the next data storage operation will occur. At any given time, the three data logs, 41–43, contain data representing the magnitudes of the monitored parameters over the most recent 10 seconds, 20 seconds, and 100 seconds, respectively. These data records were stored at frequencies of 0.5 second, 1.0 second, and 5.0 seconds, respectively. As a result, the three data logs allow the most recent past to be analyzed with one resolution for a longer period of time, a higher resolution for a shorter period of time and a highest resolution for the shortest period of time. These combinations of time period coverage and resolution provide the ability to analyze the recent past, prior to a catastrophic event or engine failure, with an advantageous combination of both time duration of the analysis and the resolution of the individual data points.

When the operator of a marine vessel initiates operation of the vessel, by operating an ignition switch, the present invention changes from the current one of the two groups of data logs to the other group. When this is done, the newly selected group of data logs is first cleared, or zeroed, and then data is sequentially stored as records in the three data logs as described above. This procedure continues until either the engine is turned off or a catastrophic event or engine failure occurs, resulting in the engine ceasing to run. At that time, the data remaining in the selected group of data logs represents valuable information that can be used in the analysis of the catastrophic event or engine failure. When the operator attempts to restart the engine, using the ignition switch, the present invention first determines whether or not it is advisable to switch the data storage operation to the other group of data logs. This is done by monitoring the time elapsed since the ignition switch is activated in combination with a monitoring of the engine speed. First, one second must pass after the activation of the ignition switch prior to the storage of data in the newly selected group of data logs. In addition, the engine speed must reach and exceed 400 RPM. If these two events do not occur, the present invention will not switch over to the other group of data logs and, therefore, will not clear or zero the data presently stored in the newly selected group. This saves the data from inadvertent destruction or erasure following a catastrophic event or engine failure about which analysis is necessary.

Figure 4:
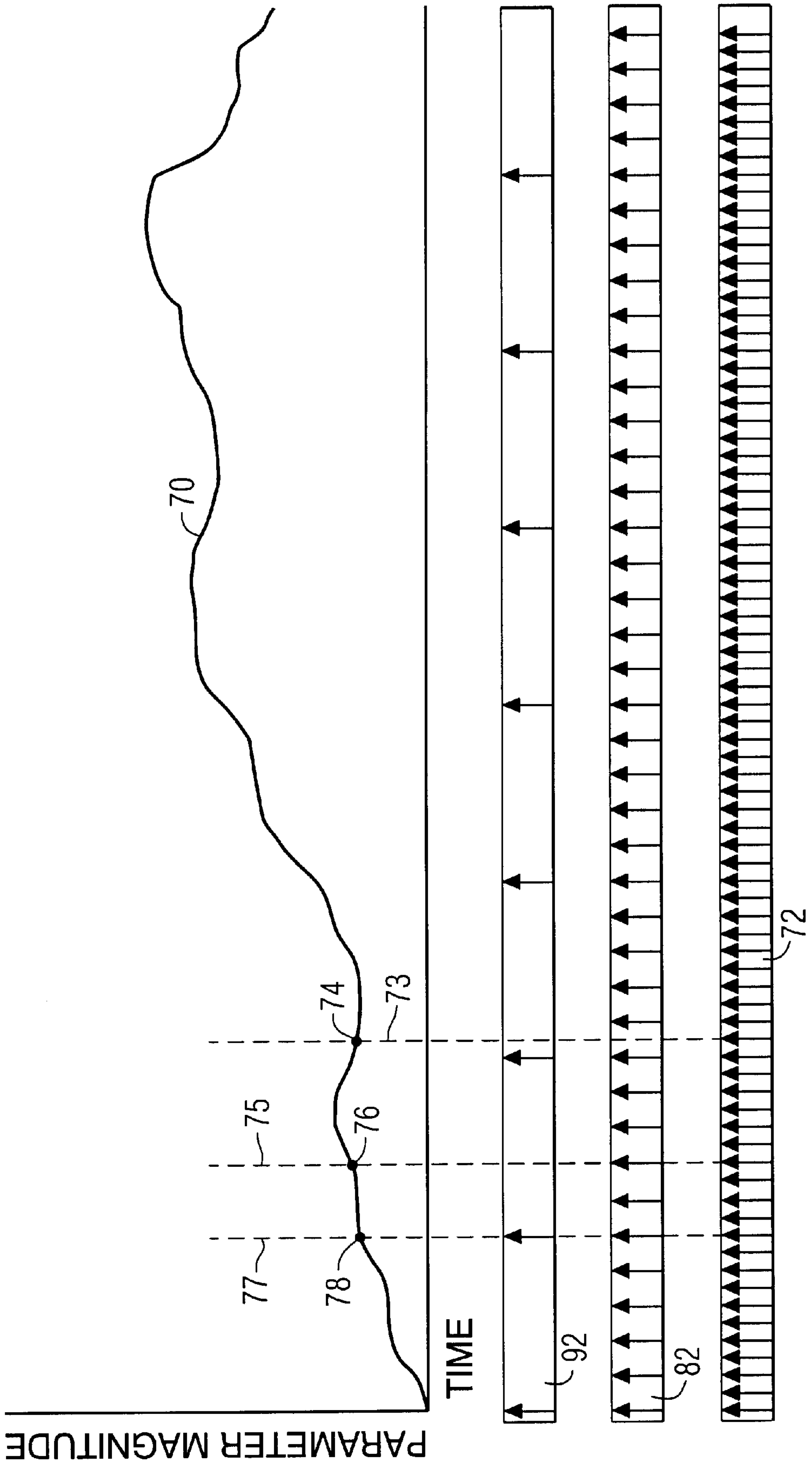
FIG. 4 is a hypothetical time-based graphical representation of a parameter in relation to the occurrences of various data storing steps.

FIG. 4 is a hypothetical representation of a changing parameter 70, such as throttle position, illustrated in combination with storage events. The family of arrows represented by reference numeral 72 in FIG. 4 represents a sequence of storage events occurring at 0.5 second intervals. With reference to FIGS. 3 and 4, it should be understood that data would be stored in sequential records 40 of the first data log 41 upon the occurrence of each of the arrows 72 that represent events occurring at a frequency of two events per second. Dashed line 73 connects an arrow of the group of arrows 72 to a particular data point 74 which represents a magnitude of the parameter 70. Dashed line 75 represents the storage of a magnitude of parameters 70 represented at point 76. Similarly, dashed line 77 represents the storage of a magnitude 78 of parameter 70.

With continued reference to FIG. 4, each of the arrows 72 represents the storing of a record in data log 41, each of the arrows 82 represents the storage of a record in data log 42, and each of the arrows 92 represents the storing of a record in data log 43. The storing operations represented by arrows 72 occur once every 0.5 second, the storing operations represented by arrows 82 occur once every 1.0 second, and the storing operations represented by arrows 92 occur once every 5.0 seconds. As represented by dashed lines 73, 75, and 77, some storing operations affect only data log 41, as represented by dashed line 73, some recording operations affect data logs 41 and 42, as represented by dashed line 75, and some storing operations affect all three data logs, 41–43, as represented by dashed line 77. As a result of the timing of these storing operations, the information stored in the first data log 41 covers a period of time equivalent to ten seconds and the individual data records represent magnitudes occurring in 0.5 second increments. The data stored in the second data log 42 covers a period of twenty seconds and the individual data records occur at 1.0 second intervals. Data stored in the third data log 43 covers a period of 100 seconds and the individual data records occur in 5.0 seconds increments. As a result, an analysis of the data following a catastrophic event, such as an accident or engine failure, allows the analyst to review the operation of a marine vessel in a combination of ways. A relatively long period of time (i.e. 100 seconds) can be analyzed with a resolution of 5.0 seconds between individual records. Secondly, the analyst can analyze the prior twenty seconds before the catastrophic event with a resolution of one second between data records. Thirdly, the analyst can review the ten second period immediately prior to the catastrophic event with a highest resolution of 0.5 second intervals.

With reference to FIGS. 3 and 4, it can be seen that the stored data, saved according to a preferred embodiment of the present invention, allows an analyst to review the data in the manner that not only covers a relatively large period of time, but also provides significant resolution for the most recent time period prior to the event being analyzed. The present invention allows this to be accomplished while only requiring a minimal storage space. For example, using the sizes described above, the three data logs, 41–43, utilize sixty records which, in the embodiment described immediately above, require only 480 bytes of memory storage. When two groups of data logs are used, a total of only 960 bytes are required. By using this minimal amount of memory capacity, the present invention can nonetheless provide information that allows an analyst significant capabilities.

One problem that must be considered in developing any type of data storage system for use in analyzing magnitudes of parameters immediately prior to a catastrophic event relates to the possibility that the stored data can be inadvertently destroyed. This is a particular problem when a minimal memory capacity is used. In other words, in order to reduce the required memory capacity for the data storing process, data is continually rewritten over previously recorded data. As described above in conjunction with FIG. 3, the indices, 51–53, or pointers, are continually moved downward through the data logs and then back to the first record of each data log. This process continues as long as data is being recorded. As a result, data log 41 contains information covering only the most recent ten second period prior to any event that is to be analyzed. Similarly, the second data log 42 contains only the most recent twenty seconds and the third data log 43 contains only the most recent one hundred seconds. As a result, unless some other safeguard is provided, a subsequent restart of the engine of a marine propulsion system could write over existing data and make future analysis impossible. In other words, if the engine is restarted after an accident, and run for 100 seconds, all of the data contained in the three data logs would be written over and destroyed. In order to prevent this deleterious result, the present invention takes several steps which act to safeguard previously recorded data in the event of a catastrophic event. First, the present invention provides two groups of data logs in which each of the two groups is similar to that arrangement described above in conjunction with FIG. 3. Furthermore, the data recording software of the present invention switches from one group to the other for subsequent restarts of the engine. Thirdly, a new data recording process is not initiated or enabled, unless certain prerequisite conditions are met.

Figure 5:
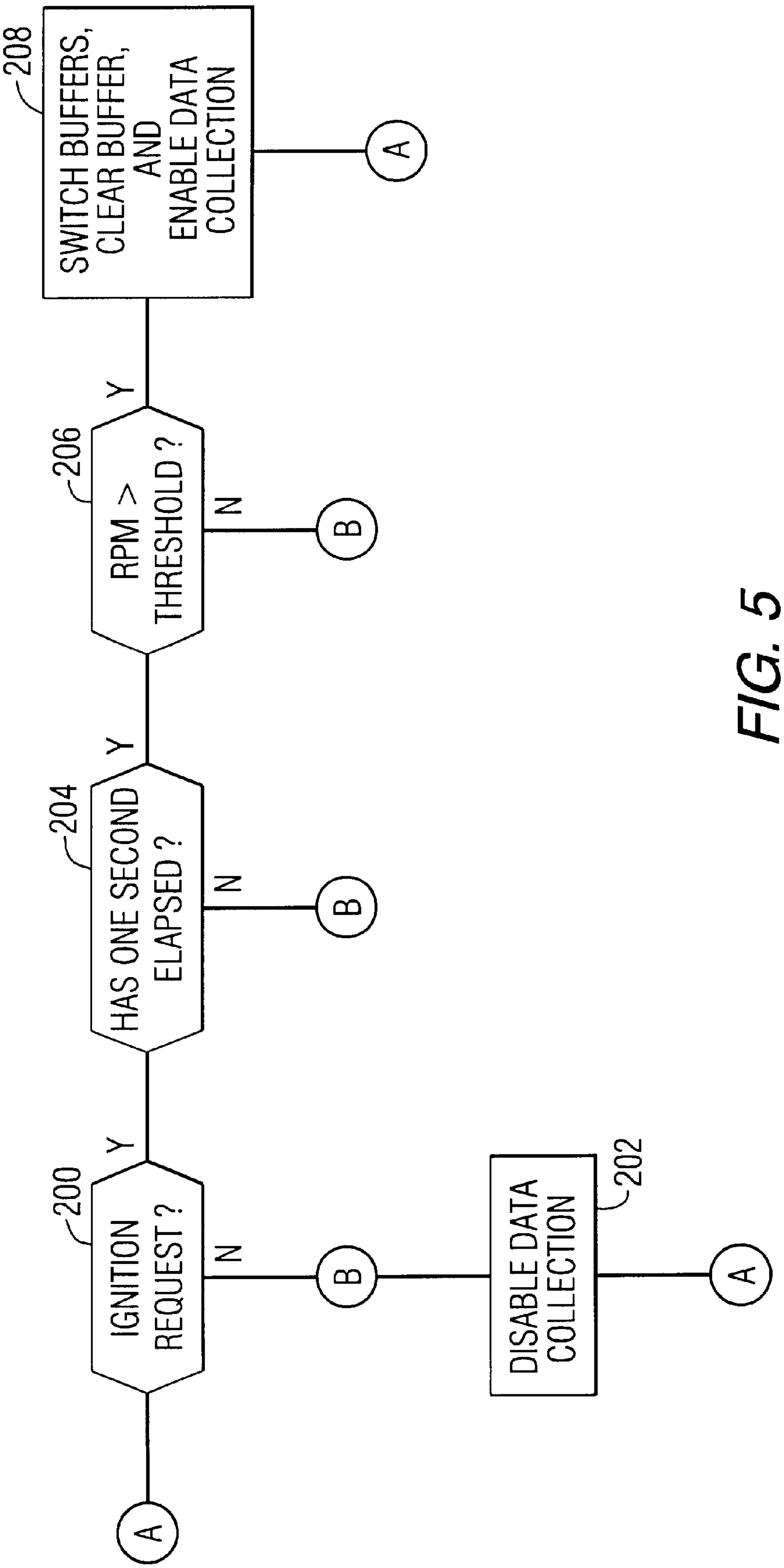
FIG. 5 is a flow chart of a determination of whether or not data collection should be enabled or disabled.

FIG. 5 is a simplified flow chart showing the way in which the present invention safeguards data in the event that an engine of a marine propulsion system is restarted. Beginning at point A, a software program determines whether or not an ignition request has occurred. This is represented by functional block 200 in FIG. 5. If no ignition request has been received and the engine is not currently operating, the program proceeds to point B and disables the data collection process as represented in functional block 202. It then returns to the starting point. If, on the other hand, an ignition request has been received and the engine is operating, two interrogations are made. First, the software determines whether or not one second has elapsed since the initial receipt of the ignition request. This is shown in functional block 204. Also, the software determines whether or not the engine speed is greater than a threshold, such as 400 RPM. This is represented in functional block 206. Since the idle speed of the engine of a marine propulsion system is typically equal to or greater than 550 RPM, functional blocks 204 and 206 determine whether or not the engine is properly running at a sufficient speed and duration for the data collection process to begin. If both functional blocks, 204 and 206, are satisfied, the software directs its attention to the other group of data logs, or buffers, clears or erases the newly selected data log and then enables future data collection. Since FIG. 5 is a highly simplified functional flow chart, it does not describe and illustrate each individual function in terms of the appropriate flags to be set or cleared to assure that the processes shown in functional block 208 do not erase data after the engine is running and has satisfied the criteria of functional blocks 204 and 206. In other words, once functional block 208 is performed once subsequent to an ignition request, appropriate flags are set to prevent future clearing and switching of buffers.

As a result of the process described above in conjunction with FIG. 5, the present invention will allow the switching from one group of data logs to the other group of data logs only when the software is satisfied that the engine is appropriately running for one second and has achieved an engine speed greater than 400 RPM. This is not expected to occur following a catastrophic event such as a serious accident or engine failure.

Figure 6:
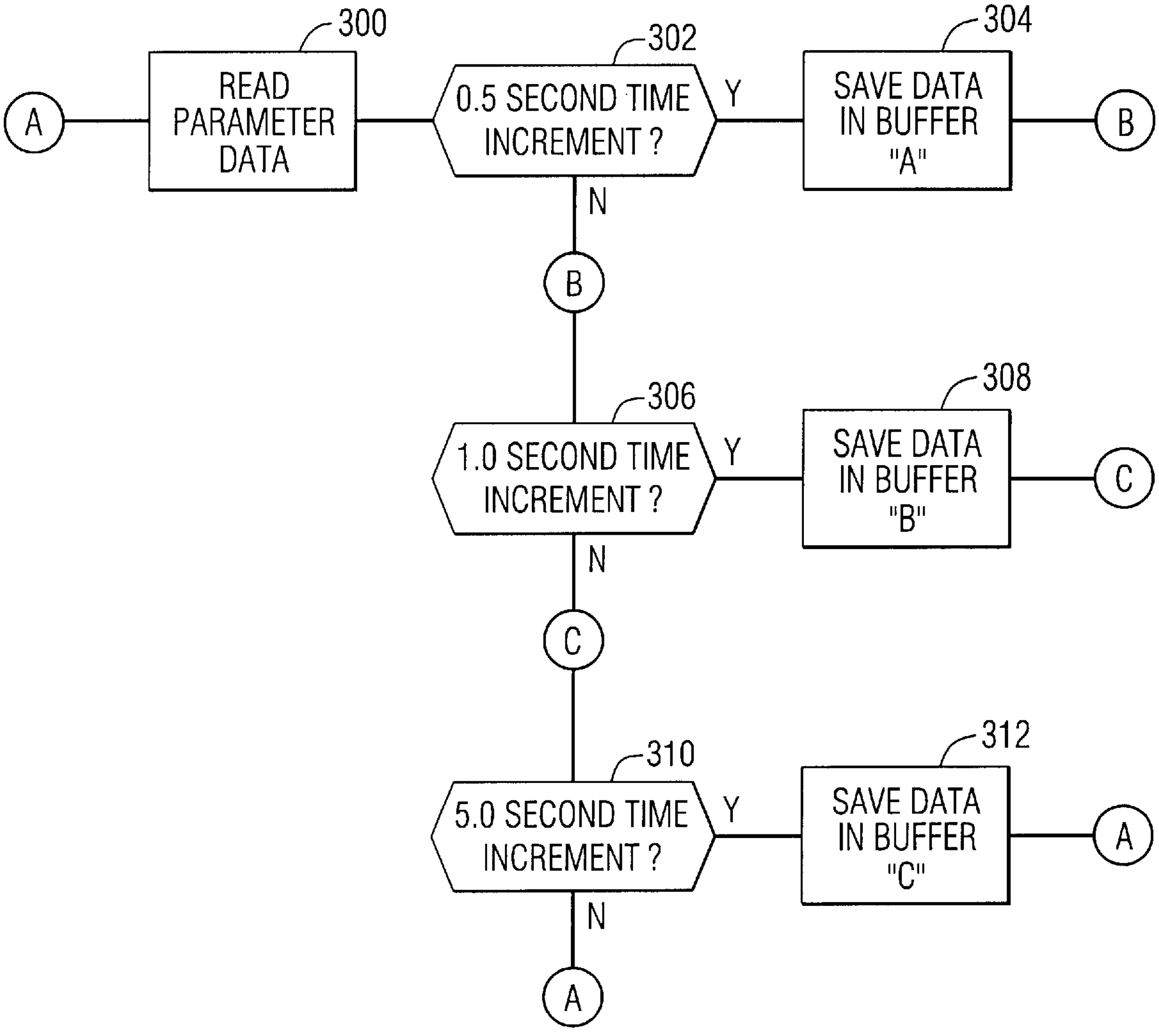
FIG. 6 is a simplified flow chart of the data storing steps performed by the present invention.

FIG. 6 illustrates a simplified flow chart that describes the process of storing data after the functional blocks, 204 and 206, in FIG. 5 are satisfied and the group of data logs is selected and clearly as represented in functional 208 of FIG. 5. In FIG. 6, beginning at step A, the appropriate parameter data is read as represented by functional block 300. This parameter data would typically represent the current magnitudes of engine speed, engine running time, boat speed, steering angle, trim position, throttle position demand, and gear or neutral status of the marine propulsion system. The data is then appropriately arranged into a format such as the data record illustrated in FIG. 2. In this example, the process includes the step of temporarily saving the seven parameter magnitudes in an eight byte package. After preparing the data into the format shown in FIG. 2, the present invention compares an incrementing elapsed time variable to determine whether or not a 0.5 second time increment has elapsed since the last storing operation was performed in relation to the first data log 41. This interrogation is shown in functional block 302. If the interrogation of functional block 302 is affirmative, the data is saved in a preselected data log, such as data log 41 in FIG. 3. This is represented by functional block 304. The operation identified by functional block 304 would correspond to any one of the arrows 72 described above in conjunction with FIG. 4. The program then goes to step B and a further interrogation, relating to a 1.0 second time increment is performed at functional block 306. If the time interrogation of functional block 306 is answered in the affirmative, data is also saved in another preselected data log, such as the second data log 42 described in conjunction with FIG. 3. This is represented at functional block 308.

With continued reference to FIG. 6, the program then goes to point C and the 5.0 second interrogation of functional block 310 is performed. If affirmative, the data is stored in a third preselected data log, such as the third data log 43 described above in conjunction with FIG. 3. This is represented by functional block 312 in FIG. 6.

With continued reference to FIG. 6, it can be seen that the data read at functional block 300 can be stored in all three data logs, 41–43, during one pass through the flow chart. It should be clearly understood that the specific time increments described in functional blocks 302, 306, and 310, are not limiting to the present invention. In other words, the resolution of data logs 41–43 can be selected to any appropriate time increment within the capability of the microprocessor used to perform the program represented by the flow chart in FIG. 6. In addition, it should be understood that the data may be stored in only one data log, as described above in conjunction with dashed line 73 in FIG. 4, into two data logs, as described above in conjunction with dashed line 75 of FIG. 4, or in all three data logs as described above in conjunction with dashed line 77 in FIG. 4.

The present invention provides a data storing method for a marine propulsion system that creates historic data for later analysis subsequent to a catastrophic event, such as an engine failure or an accident which results in an immediate engine shut down, thus terminating the logging of the data. The data is stored in three data logs and the present invention provides two groups of three data logs to allow historic data to be saved following a single restart of the engine. After certain conditions are satisfied, such as elapsed running time subsequent to an ignition command or the achievement of a preselected engine speed, the present invention directs its attention from the most recently used group of data logs to an alternative group of data logs which is initially cleared prior to the initiation of data storing steps. This switch from one group to another is only performed after the program determined that the engine has been running for at least one second and the engine has achieved an operating speed in excess of 400 RPM. These interrogations prevent an inadvertent clearing of historic data after a catastrophic event even though someone may attempt to restart the engine unsuccessfully.

Although the present invention has been described in particular detail and illustrated to show a particularly preferred embodiment, it should be understood that alternative embodiments are also within its scope.

We claim:

1. A data recording method for a marine propulsion device, comprising the steps of:

providing first and second groups of data logs;

monitoring an operating status of said marine propulsion device;

measuring a magnitude of a first parameter;

measuring elapsed time;

selecting one of said first and second groups of data logs as a function of a change in said operating status of said marine propulsion device and the identity of a previously selected one of said first and second groups; and storing said magnitude of said first parameter as a record in said selected one of said first and second groups of data logs in response to said elapsed time being generally equal to an integral multiple of a preselected time increment.

2. The method of claim 1, wherein:

each of said first and second groups of data logs comprises three data logs.

3. The method of claim 2, wherein:

said integral multiple of a preselected time increment is different for each of said three data logs within each of said first and second groups.

4. The method of claim 1, further comprising:

measuring the elapsed running time since a most recent change of said operating status of said marine propulsion device; and disabling said storing step until said elapsed running time equals or exceeds a predefined magnitude.

5. The method of claim 1, further comprising:

measuring an operating characteristic of said marine propulsion device; and disabling said storing step until said operating characteristic equals or exceeds a predefined magnitude.

6. The method of claim 1, further comprising:

erasing said selected one of said first and second groups of data logs in response to said change in said operating status of said marine propulsion device.

7. The method of claim 1, wherein:

said first parameter is selected from a group consisting of engine speed, engine running time, boat speed, steering angle, trim position, throttle position, and gear selection.

8. The method of claim 1, wherein:

said operating status of said marine propulsion device is determined by monitoring the condition of an ignition switch.

9. The method of claim 1, wherein:

said selecting step comprises the step of the one of said first and second groups of data logs not currently selected at the time of said change in said operating status of said marine propulsion device.

10. The method of claim 1, wherein:

said integral multiple of a preselected time increment is selected from a group consisting of 0.5 second, 1.0 second, and 5.0 seconds.

11. A data recording method for a marine propulsion device, comprising the steps of:

providing first and second groups of data logs;

monitoring an operating status of said marine propulsion device;

measuring a magnitude of a first parameter, said first parameter being selected from a group consisting of engine speed, engine running time, boat speed, steering angle, trim position, throttle position, and gear selection;

measuring elapsed time;

selecting one of said first and second groups of data logs as a function of a change in said operating status of said marine propulsion device and the identity of a previously selected one of said first and second groups;

storing said magnitude of said first parameter as a record in said selected one of said first and second groups of data logs in response to said elapsed time being generally equal to an integral multiple of a preselected time increment;

measuring the elapsed running time since a most recent change of said operating status of said marine propulsion device; and disabling said storing step until said elapsed running time equals or exceeds a predefined magnitude.

12. The method of claim 11, further comprising:

measuring an operating characteristic of said marine propulsion device; and disabling said storing step until said operating characteristic equals or exceeds a predefined magnitude.

13. The method of claim 12, wherein:

each of said first and second groups of data logs comprises three data logs.

14. The method of claim 13, wherein:

said integral multiple of a preselected time increment is different for each of said three data logs within each of said first and second groups.

15. The method of claim 14, further comprising:

erasing said selected one of said first and second groups of data logs in response to said change in said operating status of said marine propulsion device.

16. The method of claim 15, wherein:

said operating status of said marine propulsion device is determined by monitoring the condition of an ignition switch; and said selecting step comprises the step of the one of said first and second groups of data logs not currently selected at the time of said change in said operating status of said marine propulsion device.

17. The method of claim 16, wherein:

said integral multiple of a preselected time increment is selected from a group consisting of 0.5 second, 1.0 second, and 5.0 seconds.

18. A data recording method for a marine propulsion device, comprising the steps of:

obtaining a current magnitude of a first parameter, said first parameter being selected from a group consisting of engine speed, engine running time, boat speed, steering angle, trim position, throttle position, and gear selection;

measuring elapsed time;

storing said current magnitude of said first parameter in a first log if said elapsed time satisfies a first frequency criterion;

storing said current magnitude of said first parameter in a second log if said elapsed time satisfies a second frequency criterion;

monitoring an operating characteristic of said marine propulsion device;

inhibiting said storing step if said operating characteristic unless said operating characteristic meets a preselected criterion; and clearing said first and second logs of previously stored data upon the initial occurrence of said operating characteristic meeting said preselected criterion.

19. The method of claim 18, further comprising:

monitoring a predefined change in an operating status of said marine propulsion device;

providing a third log and a fourth log;

storing said current magnitude of said first parameter in said third log if said elapsed time satisfies said first frequency criterion and said change in said operating status satisfies a predefined sequence in combination with an immediately preceding data storage procedure; and storing said current magnitude of said first parameter in said fourth log if said elapsed time satisfies said second frequency criterion and said change in said operating status satisfies said predefined sequence in combination with said immediately preceding data storage procedure.

20. The method of claim 19, wherein:

said first frequency criterion is a multiple of 0.1 second.

* * * * *